April 14, 1964 J. H. HOHL 3,129,337
MAGETIC CORE SWITCHING SYSTEM
Filed April 20, 1960 2 Sheets-Sheet 1
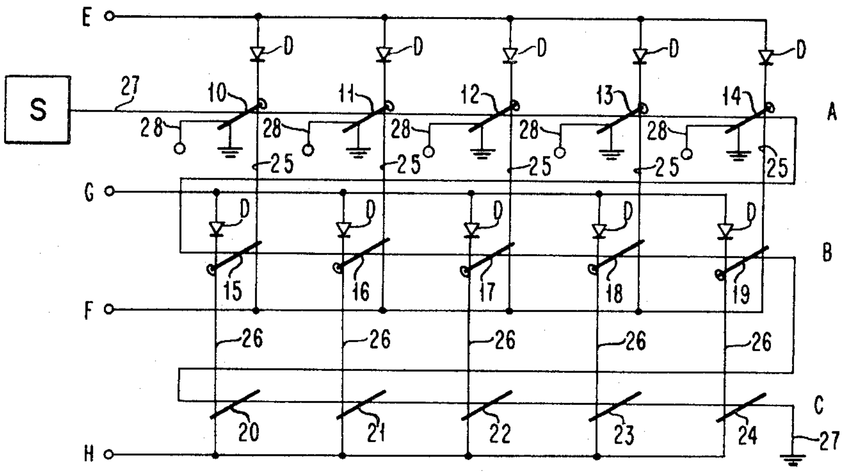
FIG. 1
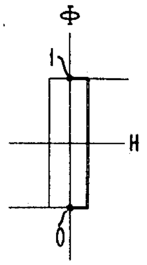
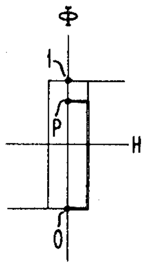
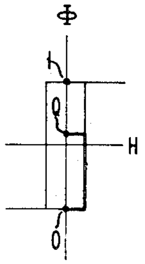
FIG. 2a FIG. 2b FIG. 2c
INVENTOR
JAKOB H. HOHL
BY [signature]
ATTORNEY United States Patent Office 3,129,337

Patented Apr. 14, 1964

3,129,337

MAGNETIC CORE SWITCHING SYSTEM

Jakob H. Hohl, Adliswil, Zurich, Switzerland, assignor to International Business Machines Corporation, New York, N.Y., a corporation of New York Filed Apr. 20, 1960, Ser. No. 23,528
3 Claims. (Cl. 307—88)

Figure 3A:
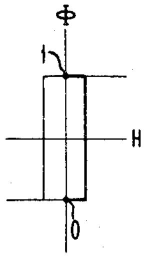

This invention relates to a magnetic core switching system and more particularly to an improved switching system wherein data from one set of cores is successively transferred to successive sets of cores by sequential energization of sequential sets of transfer circuits coupling the cores of successive sets with an impulse of one polarity and an opposite polarity with the cores of different sets preset to alternate stable states.

Switching systems employing magnetic bistable elements have been found to be desirable in today's electronic computers due to their inherent reliability and low component cost. Historically, elements, such as toroidal magnetic cores, have been employed to store binary information which is represented by the different stable remanent states of the core, designated as 0 and 1. When information transfer is required between different cores, the one core having this information is either read out and returned to a datum stable state, the 0 state, or, the fact that a saturated core represents a high impedance for current in one direction and a low impedance for current in the opposite direction is utilized. In this latter case, if a core is saturated to assume remanence in one stable state, say the 1 state, and a current is passed through a winding coupling this core such as to switch the core to the 1 state, the winding appears as a low impedance and hence the current is available to switch another core coupled in the circuit. This type operation is exemplified in U.S. Patent 2,681,181, issued June 15, 1954, to R. E. Spencer, and another U.S. patent, 2,742,-632, issued April 17, 1956, to R. L. Whitely.

It has been found that by employing cores in a system according to the teachings of the above cited patents, when information transfer takes place, often one core or a number of cores are not fully switched but only partially switched and as this information is successively transferred over different lines or groups of cores the partially switched condition becomes progressively worse and the information represented thereby lost.

Accordingly, it is a prime object of this invention to provide a new and improved circuit for performing switching operations.

Another object of this invention is to provide a new and improved circuit employing magnetic bistable elements for performing switching operations.

These and other objects are realized by constructing a switching circuit in accordance with the teachings of this invention wherein *n* groups of bistable magnetic cores are provided, with each group employed to designate given information in the form of a plurality of binary bits. Alternate groups of cores are preset to one stable state while the other groups are preset to an opposite stable state. A first plurality of transfer circuits is provided each coupling a core in an odd group of the *n* groups and a core in the succeeding even group of the *n* groups; a second plurality of transfer circuits is provided each coupling a core in an even group of the *n* groups and a core in the succeeding odd group of the *n* groups. The information, or data, retained in one group of the *n* groups is progressively advanced to succeeding groups in order by sequentially energizing the transfer circuits coupling the group of cores retaining the information and the first succeeding group of cores with an impulse of one polarity and thereafter energizing the transfer circuits coupling the first and second succeeding groups with an impulse of opposite polarity whereby information transfer is first controlled by one group into a second group and then controlled by the second group into the third group.

The foregoing and other objects, features and advantages of the invention will be apparent from the following more particular description of a preferred embodiment of the invention, as illustrated in the accompanying drawings.

In the drawings:

FIG. 1 is a switching system heretofore proposed.

Figure 3B:
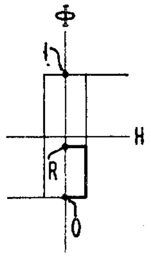

FIGS. 2 and 3 exhibit a characteristic of the type material employed for the bistable elements utilized.

Figure 4:
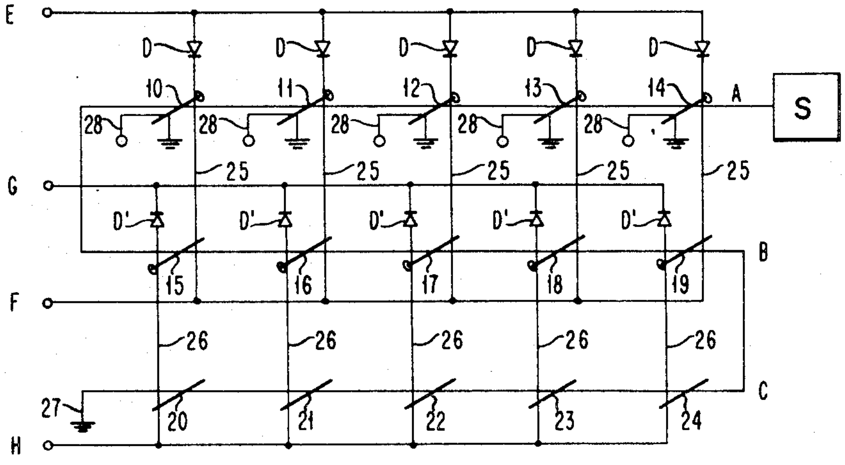

FIG. 4 is an embodiment of this invention.

Referring to the FIG. 1, a plurality of bistable magnetic cores 10, 11, 12 . . . 24 are shown arranged in a number of rows A, B and C. A plurality of transfer lines 25 and 26 are provided with each of the lines 25 coupling one of the cores 10–14 of row A and one of the cores 15–19 of row B, while each of the lines 26 couple one of the cores 15–19 of row B and one of the cores 20–24 of row C. A diode D is provided serially connected in each transfer line 25 and 26. The lines 25 are connected in parallel with one another between terminals E and F, while similarly the lines 26 are connected in parallel with one another between terminals G and H. Each of the cores 10–24 is coupled by a reset line 27 grounded at one end and connected to a source S at the other end. Individual input windings 28 are provided for each of the cores 10–14 adapted to register input information by switching of the associated core to a desired information stable state.

Assuming the source S presets the cores 10–24 to a first stable state, hereinafter referred to as the 0 state, by energization of the line 27, information is then entered into the matrix by energization of selected input windings 28 to switch the associated cores to another stable state, hereinafter referred to as the 1 state. Assume the input information is such that the cores 10 and 11 are left in the 1 state while the cores 12–14 are left in the 0 state. The information retained in the cores 10–14 to be utilized must be transferred to perform other machine operations. Transfer of information is achieved by energizing the terminals E and F to provide current flow through the diodes D.

As may be seen, with reference to the circuit of FIG. 1, any one transfer line 25 couples one core of row A with a greater number of turns than an associated core of row B, while similarly, any one transfer line 26 couples one core of row B with a greater number of turns than an associated core of row C. Further, the transfer lines 25 couple the cores 10–14 of row A and the cores 15–19 of row B to cause switching of these cores from the 0 to the 1 state with current flow through the associated diodes D in the positive direction, while the transfer lines 26 couple the cores 15–19 of row B and the cores 20–24 of row C in a similar manner. Assuming, in a first cycle of operation, the terminals E and F are energized to provide current flow in the positive direction through the diodes D of the transfer lines 25, since both the cores 10 and 11 are already in the 1 stable state they present a small impedance in their lines 25, but the cores 12, 13 and 14 present a high impedance since they are in the 0 state. Although the cores 17–19 of the row B associated with the cores 12–14 of row A are also in the 0 state at this time, for a given current in any one line 25 the amount of drive, or field, applied to any one core, is dependent upon the number of turns on any one core. Since the cores of row A coupled by the transfer lines 25 have a greater number of turns thereon, they will switch first. The cores 10 and 11 of row A being in the 1 state when the terminals E and F are energized present a low impedance allowing the cores 15 and 16 of the row B to switch from the 0 to the 1 state while the cores 12, 13 and 14 of row A switch toward the 1 state leaving the cores 17–19 of row B in the 0 state. In this respect, it should be noted that once the core 15 or 16 of row B is completely switched, the impedance of the transfer line 25 is essentially negligible and presents a short circuit impedance to the drive cutting off any further switching in the transfer circuit 25, and hence the associated cores 10–19. Thus upon termination of the energization of terminals E and F, the cores 10, 11, 15 and 16 are left in the 1 state while the cores 17–19 are left in the 0 state. Successive transfer of this information is then achieved by similarly energizing the terminals G and H to switch the cores 17–19 of row B toward the 1 state and the cores 20 and 21 of row C to the 1 state leaving the cores 22–24 in the 0 state.

Referring now to the FIGS. 2*a*, 2*b*, 2*c*, 3*a* and 3*b*, an idealized plot of flux ($\phi$) versus applied field is shown characterizing the rectangular hysteresis loop material of which the cores 10–24 are made. The opposite remanent states of the material are utilized to represent binary information and labelled 0 and 1, respectively. Although all of the curves shown are similar, it should be realized that not all cores can be made with exactly similar characteristics due to minor flaws in the material's homogeneity, nor can all diodes be made to perform exactly the same. Further, during the first transfer operation described above with respect to the circuit of FIG. 1, to fully comprehend the switching phenomena of the circuit, consider each transfer line 25 with a source of potential V applied to the terminals E and F. With the voltage V applied to the terminals E and F the equation $$E \cdot t = N_1 \Delta\phi A = N_2 \Delta\phi B$$

exists, where $t$ represents time, $N_1$ is the number of turns on any one core 10–14 of row A; $\Delta\phi A$ is the flux change in any one core 10–14 of row A; $N_2$ is the number of turns on any one core 15–19 of row B; and $\Delta\phi B$ is the change of flux in any one core 15–19 of row B. Since the amount of turns on any one core in row A is approximately double that on any one core in row B for the transfer lines 25, then since $$N_1 \Delta\phi A = N_2 \Delta\phi B$$

the ratio of flux change in any one core in row B with respect to row A is approximately $$\frac{\Delta\phi A}{\Delta\phi B} = \frac{1}{2}$$

or, the total flux change which must take place in a core 15–19 of row B is twice that of any one core 10–14 of row A. Stated differently, to fully switch any one core 15–19 of row B by means of a transfer line 25, only half the total flux change in any one core 10–14 of row A need take place. The same argument holds true with respect to the cores 15–19 of row B with respect to the cores 20–24 of row C when utilizing the transfer lines 26. Thus in the first cycle of transfer from the cores of row A to the cores of row B, the cores 12–14 of row A are not completely switched to the 1 state, but are switched to a state Q, as shown in the FIG. 2*c*, leaving the cores 17–19 of row B in the 0 state.

If one of the two cores 15 and 16, for example core 16, in the first transfer cycle switches somewhat slower, due to the differences described, a short circuit impedance is provided when the other core, core 15, is fully switched, thus leaving core 15 in the 1 state as shown in the FIG. 2*a* while the core 16 which switched slower is left at a point P, as shown in the FIG. 2*b*. Under these conditions, upon initiation of a second transfer from row B to the row C of the FIG. 1, the cores 16–19 of row B represent a high impedance while the core 15 represents a low impedance in their respective transfer lines 26. The cores 17–19 of row B then switch from the 0 state to a point Q, as shown in the FIG. 2*c*, while the core 20, of row C is switched to the 1 state as shown in the FIG. 3*a* the core 21, of row C is switched to a point R as shown in the FIG. 3*b*.

The severity of any partial switching in any one core of a given row in such a transfer operation becomes clear upon considering an analysis of the phenomena. Since $$E \cdot t = N_4 \Delta\phi C = N_3 \Delta\phi B$$

again $$\frac{\Delta\phi B}{\Delta\phi C} = \frac{N_4}{N_3} = \frac{1}{2}$$

where $\Delta\phi C$ represents the flux change of any one core in row C and $N_4$ the number of turns thereon; $\Delta\phi B$ represents the flux change of any one core in row B and $N_3$ represents the number of turns thereon for the transfer circuits 26. If we assume that the flux in the one core in row B is decreased by a given increment, then $$\Delta\phi B = k_1 \Delta\phi \text{ where } \phi < k_1 < 1$$

thus if we further assume the second transfer from row B to row C is lossless, then $$E_2 t = N_4 \Delta\phi = N_3(1-k_1)\Delta\phi + N_4 k_2 \Delta\phi$$

and $$1 = 2(1-k_1) + k_2$$

$$k_2 = 1 - 2 + 2k_1 = 2k_1 - 1$$

$$k_2 = 2(k_1 - 1) + 1$$

therefore $$k_n = 2^{n-1}(k_1 - 1) + 1$$

when $n$ represents a given number of transfers or groups to which this information is to be transferred. If we assume a limit where $$k_n = \tfrac{1}{2}$$

then $$\tfrac{1}{2} = 2^{n-1}(k-1) + 1$$

and $$2^{-n} = (1 - k_1)$$

therefore $$n = \log_2(1 - k_1) - 1$$

As may be seen by the above equation if only a small fraction of partial switching occurs in any one core of a group, the information is lost very rapidly. Manifestly, after a few cycles of transfer, the one of two bits looses more flux and after a few transfer operations disappears.

Referring now to the FIG. 4, the circuit of FIG. 1 is substantially shown except that the diodes D of the transfer lines 26 are reversed and labelled D' to set forth this distinction while the manner in which the reset line 27 couples the cores 10–14 of row A and the cores 20–24 of row C are also reversed as shown.

Upon energization of the reset winding 27 by the source S, all the cores 15–19 of the row B are preset to the 0 state while the cores 10–14 and 20–24 of the rows A and C, respectively, are preset to the 1 state. Assuming the input windings 28 of the cores 10–14 are energized to cause the cores 10 and 11 to assume the 1 state, and the cores 12–14 to assume that 0 state, similar to the information state set forth in the operation of FIG. 1, transfer of this information is again accomplished by application of a positive impulse to the terminals E and F which switches the cores 15 and 16 of row B to the 1 state. Assume, as set forth above, one of the cores 15 or 16 is in the 1 state as shown in FIG. 2*a* while the other core is left in the state P as shown in the FIG. 2*b*.

In the next cycle of operation the terminals G and H are energized with an impulse which causes current flow in each of the transfer lines 26 in the forward direction of the diode D'. The current flow in the lines 26 is such as to cause switching of the cores 20–24 of row C and the cores 15–19 of row B toward the 0 stable state. Since the cores 17–19 of the row B are already in the 0 state, they appear as a small impedance while the cores 15 and 16 of the row B appear as a relatively high resistance. As set forth above, the coupling of the cores 15–19 of row B is approximately twice as great as the coupling of the cores 20–24 of row C by the lines 26, therefore cores 15 and 16 of row B are switched toward the 0 state while similarly the cores 22–24 of row C are switched toward the 0 state. Upon termination of the impulse to the terminals G and H, the cores 20 and 21 of row C are left in the 1 state while the cores 22–24 are left in the 0 state. Although the core 16 of row B was previously left in the P state, as shown in FIG. 2*a*, the amount of flux left in the core 16 is sufficient to block appreciable switching of the core 21 since only an amount of flux, represented by the condition Q in the FIG. 2*c*, takes place within the core 16. Such an arrangement then avoids a cumulative loss of flux, and therefore the loss of information, when transfer operation from one line of cores to another is performed.

Although a further group of cores is not shown in the FIG. 4, such a group would have information transferred similar to the transfer from group A to group B. Thus during odd cycles the binary 1's are transferred and during even cycles binary 0's are transferred and switching is accomplished by providing pulses of alternate polarity to groups of cores which are alternately in a first and a second state of magnetization.

While the invention has been particularly shown and described with reference to a preferred embodiment thereof, it will be understood by those skilled in the art that various changes in form and details may be made therein without departing from the spirit and scope of the invention.

What is claimed is:

1. A switching system adapted to progressively transfer data coded in binary form from one group of bistable elements to succeeding groups of bistable elements comprising; *n* groups of bistable magnetic cores, consisting of odd-numbered groups and even-numbered groups, means for setting all cores of said odd-numbered groups to one datum stable state and all cores of said even-numbered groups to an opposite stable state, a group of first transfer circuits corresponding to each odd-numbered group of cores each circuit of each said group of first transfer circuits coupling corresponding cores in a said odd-numbered group of said cores and in a succeeding said even-numbered group of said cores in one sense, and a group of second transfer circuits corresponding to each even-numbered group of cores, each circuit of each said group of second transfer circuits coupling corresponding cores in a said even-numbered group of said cores and in a succeeding said odd-numbered group of said cores in said one sense, said first transfer circuits coupling cores of said odd-numbered groups to a greater degree than corresponding cores of said even-numbered groups and said second transfer circuits coupling cores of said even-numbered groups to a greater degree than corresponding cores of said odd-numbered groups, said first and second groups of transfer circuits coupling successive groups of cores adapted for successive energization with impulses of one polarity applied to said first transfer circuits and impulses of opposite polarity applied to said second transfer circuits to transfer data retained in one group of cores progressively to succeeding groups of cores.

2. A switching system comprising, *n* groups of bistable magnetic cores, means for setting alternate groups of said *n* groups of cores in opposite stable states, a group of first transfer circuits corresponding to each odd-numbered group of said *n* groups of cores, each circuit of each said group of first transfer circuits coupling both a core in an odd-numbered group of said *n* groups of cores and a core in a succeeding even-numbered group of said *n* groups of cores in one sense, and a group of second transfer circuits corresponding to each even-numbered group of said *n* groups of cores, each circuit of each said group of second transfer circuits coupling both a core in a said even-numbered group and a core in a succeeding said odd-numbered group in said one sense, said first and second groups of transfer circuits coupling progressive groups of cores being responsive to the sequential energization thereof by successive impulses of one polarity applied to said first transfer circuits and of opposite polarity applied to said second transfer circuits to transfer data retained in one group of said *n* groups of cores progressively to succeeding groups of cores.

3. A switching system adapted to progressively transfer data coded in binary form from one group of bistable elements to succeeding groups of bistable elements comprising; first, second and third groups of bistable magnetic cores, means for setting all the cores of said first and third groups to one datum stable state and all cores of said second group to an opposite stable state, means for storing data in said first group, a group of first transfer circuits each circuit of said group coupling corresponding cores in a said first group and in said second group in one sense, and a group of second transfer circuits each circuit of last said group coupling corresponding cores in a said second group and in said third group in said one sense, said first transfer circuits coupling cores of said first group to a greater degree than corresponding cores of said second group and said second transfer circuits coupling cores of said second group to a greater degree than corresponding cores of said third group, said group of first transfer circuits being adapted for energization with an impulse of one polarity to transfer data retained therein to said second group of cores, and said second group of transfer circuits being adapted for subsequent energization with an impulse of opposite polarity to transfer said data from said second group of cores to said third group of cores.

References Cited in the file of this patent

UNITED STATES PATENTS

| | | |
|---|---|---|
| 2,719,773 | Karnaugh | Oct. 4, 1955 |
| 2,932,815 | Cabaniss | Apr. 12, 1960 |